Jan. 31, 1967     P. J. WERNER ETAL     3,301,441
ASPHALTIC CONCRETE STORAGE BIN
Filed Nov. 30, 1964     2 Sheets-Sheet 1
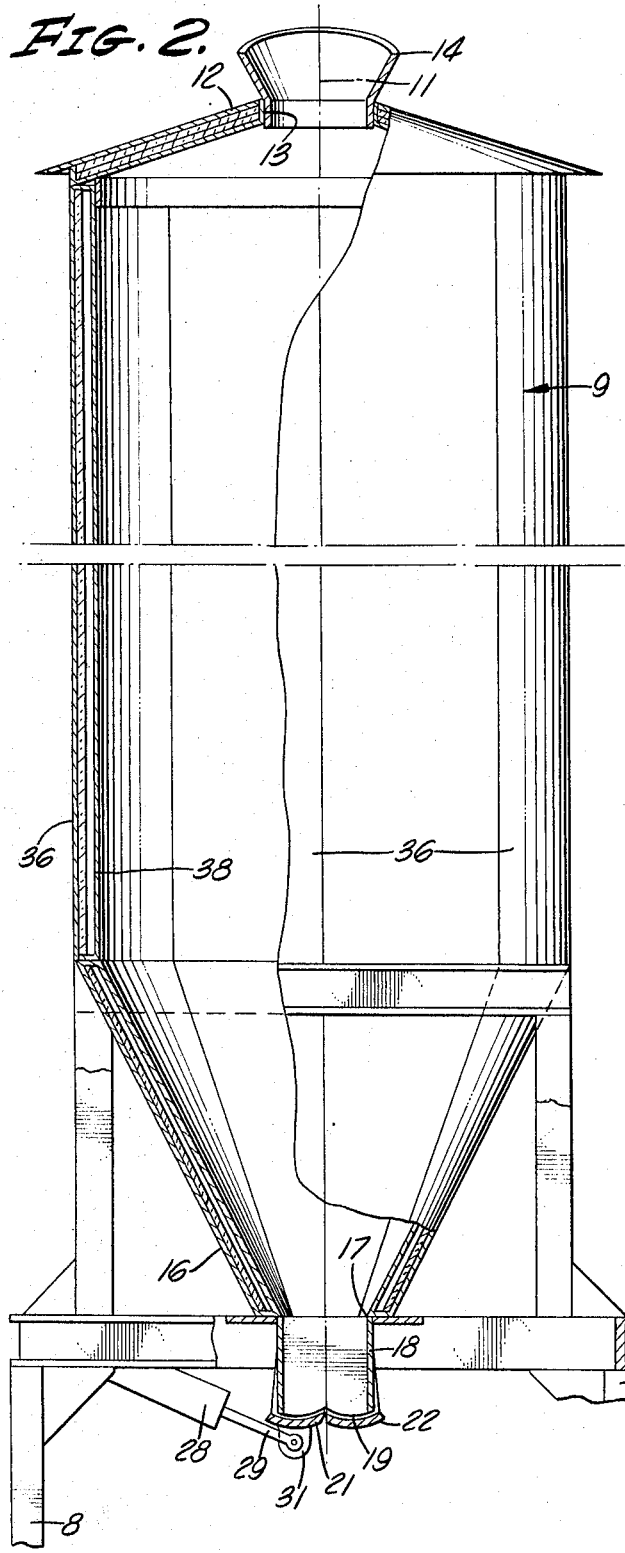
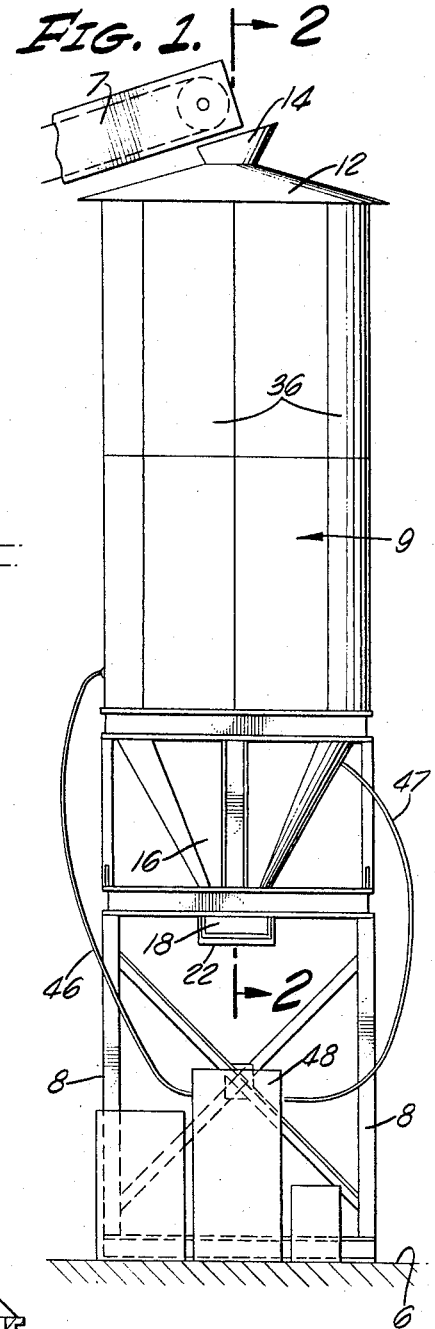
INVENTORS.
PETER J. WERNER
JOHN R. DEAN
BY Lothrop & West
ATTORNEYS Jan. 31, 1967 P. J. WERNER ETAL 3,301,441
ASPHALTIC CONCRETE STORAGE BIN
Filed Nov. 30, 1964 2 Sheets-Sheet 2
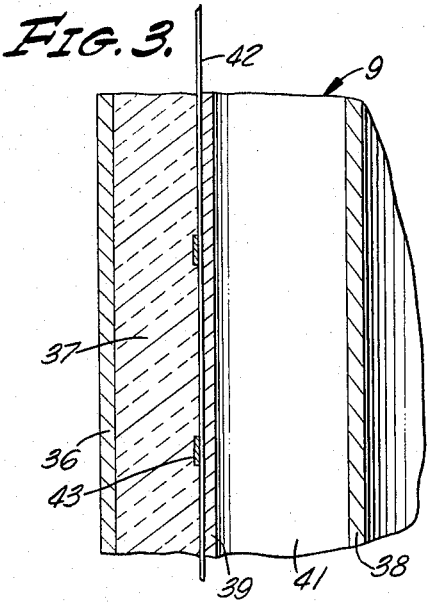
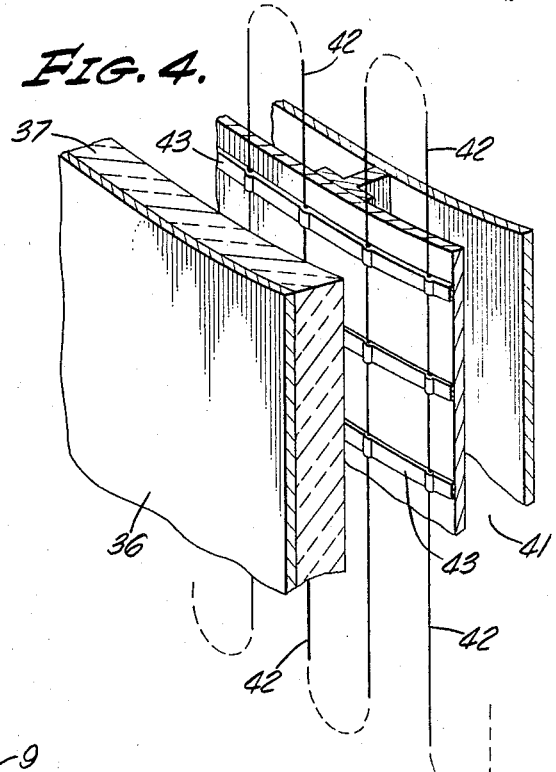
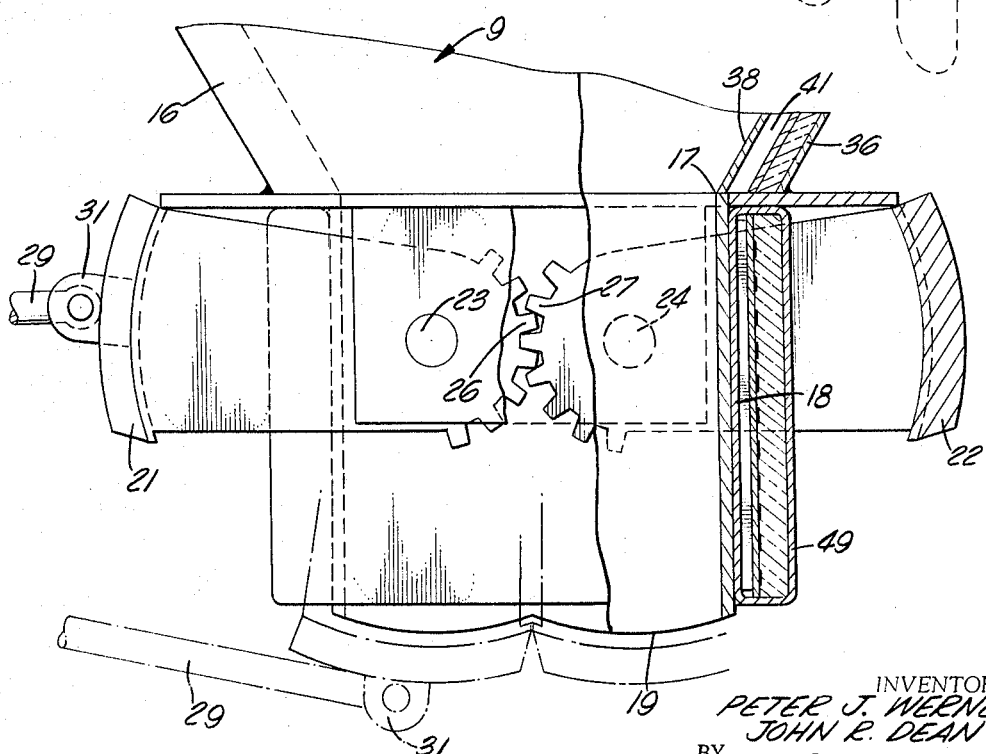
INVENTORS.
PETER J. WERNER
JOHN R. DEAN
BY Lothrop & West
ATTORNEYS United States Patent Office 3,301,441
Patented Jan. 31, 1967

3,301,441
ASPHALTIC CONCRETE STORAGE BIN
Peter J. Werner, Carmichael, and John R. Dean, Sacramento, Calif., assignors to A. Teichert & Son, Inc.
Filed Nov. 30, 1964, Ser. No. 414,792
4 Claims. (Cl. 222—146)

Our invention relates to devices for the indefinite holding of relatively large quantities of hot mixtures of asphalt and aggregates sometimes referred to as "hot mix" and generally useful for paving and coating purposes.

In the operation of the usual hot mix or asphaltic concrete business, it is necessary very carefully to coordinate the supply of hot mix with the consumption thereof since the mix normally cannot be held for any appreciable time between the mixing plant and the trucks which take it for use. It is difficult in the event of job stoppage or in the event of sudden excess demand quickly to bring the operation of the hot mix plant into corresponding condition.

There has been some demand for means to store hot mix or asphaltic concrete, but the demand has not successfully been met for various reasons. In some instances there have been difficulties in handling the mix, and particularly has there been difficulty in maintaining appropriate temperature conditions without undue cooling in one locality or undue overheating in another locality.

Additionally, it has been found that storage capacity of any substantial amount is disproportionately expensive.

It is therefore an object of the invention to provide an asphaltic concrete storage bin which is simple and economical to fabricate, erect, maintain and clean, and which is adaptable to installation in any desired location; for example, one convenient to a number of constructional activities.

Another object of the invention is to provide an asphaltic concrete storage bin well arranged from the thermal aspect so that an appropriate temperature for the stored material can be maintained over a protracted period without substantial local deviations, either too cold or too hot.

Another object of the invention is to provide an asphaltic concrete storage bin for exterior installation in which the thermal transfers between the bin and the atmosphere are relatively small and variable heating or cooling of the bin contents by the atmosphere is inappreciable.

A still further object of the invention is to provide an asphaltic concrete storage bin in which contact of the contents with the atmosphere is minimized.

A still further object of the invention is to provide an asphaltic concrete storage bin which is not only portable for ease in relocating, but which readily lends itself to arrangement in clusters to provide additional storage as and when needed.

Other objects together with the foregoing are attained in the embodiment of the invention described in the accompanying description and illustrated in the accompanying drawings, in which:

FIGURE 1 is a side elevation of an asphaltic concrete storage bin constructed pursuant to the invention, certain attendant mechanisms being broken away to reduce the figure size;

FIGURE 2 is a cross section to an enlarged scale, the plane of section being indicated by the line 2—2 of FIGURE 1 and some portions being shown in elevation;

FIGURE 3 is a detail to a considerably enlarged scale through a portion of the wall construction of the storage bin, the plane of section being an axial plane through the central axis of the storage bin;

FIGURE 4 is an isometric detail showing in somewhat displaced position the various components of the wall construction; and FIGURE 5 is a detail in elevation with portions in section on an axial plane through the lower discharging opening of the bin with the attendance gate structure.

While asphaltic concrete storage bins of various sorts can be constructed pursuant to the invention, one commercially successful form of the bin is constructed as shown herein as an example. In this installation the structure is erected on the ground 6 at any convenient location, preferably in a yard adjacent to a hot mix plant from which the product is carried by a conveyor 7. The storage bin itself includes a lower framework 8 comprised of the customary building or structural shapes and braces and is of sufficient extent so as to leave free for access a transverse driveway for trucks. Vehicles such as trucks drive easily through the driveway and can stop in a central, loading position therein.

Resting on an extension of the frame 8 is a storage bin 9. This is a self-supporting structure circular cylindrical in horizontal cross sectional contour throughout much of its height and symmetrical about a central axis 11. This configuration provides a bin of considerable internal capacity, yet a small amount of exposed wall surface. The upper end of the bin 9 has a charging cone 12 of the same general wall construction as the rest of the bin. The cone 12 converges upwardly and terminates in a charging opening 13 provided with a receiving funnel 14 immediately below the end of the conveyor 7.

At its lower end the bin 9 includes a discharging cone 16 having the same wall construction as the remainder of the bin and converging downwardly to a discharging opening 17. Continuing the lower end of the discharging cone 16 is a circular cylindrical collar 18 of relatively thin wall construction as provided by a steel plate terminating in a scalloped lower periphery 19.

For the purpose of controlling mix flow through the collar 18, gates 21 and 22 (FIGURE 5) are provided. These are individually mounted on the collar 18 by pivot shafts 23 and 24 and are provided with intermeshing gear teeth 26 and 27 so that the two gates always operate in unison in swinging about the axes of the pivot shafts 23 and 24. A hydraulic or pneumatic cylinder structure 28 is pivotally mounted on the frame 8 and has its piston rod 29 connected pivotally to ears 31 on the gate 21. When the cylinder structure 28 is operated, the gates are uniformly swung shut or swung open. When the gates are open, they can be moved from normally open, discharge position to an extremely wide position as shown in FIGURE 5, but for this purpose extraneous assistance is given to the cylinder 28. Under normal conditions, the gates swing only enough to clear the lower opening of the collar, and this is easily accomplished by the cylinder mechanism 28.

In accordance with the invention, the bin wall is especially fabricated. As particularly shown in FIGURES 3 and 4, the wall is made up of an outer protecting shell 36 made up of a number of formed steel plates welded together. Immediately within the outer protecting shell is a substantial blanket of insulation. By preference, this is a fiber glass mat 37 so that the thermal transmission in the vicinity of the wall shell 36 is substantially reduced. Within the interior of the bin there is an inner shell 38 in immediate contact on its inside with the asphaltic concrete mixture. The shell 38 is likewise fabricated of metal plates welded together. In the intervening space between the outer shell 36 and the inner shell 38 there is positioned a mounting or support wall 39. This is distant from the inner shell 38 so as to leave an intervening air space 41. Preferably, the mounting wall 39 is of a good thermal conductor such as aluminum.

Disposed on the mounting wall 39 is an electric heater element 42 in the form of conductor cables electrically insulated but not thermally insulated and held in position by clip straps 43. At intervals the clip straps are attached to the support wall 39 so that the electrical heating elements are held firmly in position. In order to control the operation of the heating elements, various conductors 46 and 47 lead to them from a central junction box 48 and appropriate thermocouples (not shown) are installed in the bin so as to regulate the electric circuits controlling the supply of heat to the bin.

Not only are the bin walls constructed as just described, but likewise a similar construction, usually without the air space, is provided for the upper cone 12 and an identical construction is applied in the building of the lower cone 16. In addition to that, since otherwise the collar 18 would not be thermally supplied, we construct a surrounding muff 49 having a construction like that of the bin wall. When the gates 21 and 22 are in their extreme, wide open position, as shown in FIGURE 5, the muff is moved into position over the collar and subsequently is fastened in place. The gates 21 and 22 then operate in their normal way, just clearing the lower corner of the muff. The heating coils of the muff likewise are included in the electric circuit.

In the operation of this device, considering that the bin is first empty, hot mix from the conveyor 7 is discharged through the charging opening 13, rests within the lower cone and finally fills part or all of the bin. Since the gates 21 and 22 are closed, the charged mass is all retained. The initial, entering temperature of the mix is considered to be optimum, and it is desired to keep the mass uniformly close to the same temperature. The electrical circuits are energized so that the heating elements are effective.

Because of the insulating layer 37 and also partly because of the outer protecting shell 36, little heat travels outwardly from the heating elements. Rather, the heat is directed inwardly toward the inner shell 38. There is good thermal conduction from the heating element through the support plate 39. It has been found in extensive previous practice that there is a material and deleterious tendency for local or spot overheating of the asphaltic concrete. To avoid this, we have particularly provided an air space 41 between the heating elements and the interior of the bin. Thus, if some portion of the mounting wall 39 should get unduly hot, the excess heat is conducted away by the air within the space 41 and is distributed over the interior shell 38. The interior of the shell and its contents are maintained at an almost exactly uniform temperature and particularly are guarded against any localized overheating. By the same token, there is also an absence of localized zones that are too cool since the air within the space 41 maintains an acceptably uniform temperature situation.

Insofar as there is radiant conduction of heat from the heating coils to the interior of the bin, the mounting plate 39 and the inner shell 38 act as re-radiators from the electric coils. Because of the two-stage process of heat transmission by radiation, the radiation to the contents is also quite uniform.

As to conduction, there is no important, direct, metallic connection between the mounting wall 39 and the inner shell 38. Practically all the conduction that occurs is through the intervening air space.

With an arrangement of this sort and with only moderately precise thermostatic control of the heat supply, and despite variations in outside climatic conditions due to the sun shining on one side of the bin, and despite variations in the direction and quantity of wind blowing, it has been found in actual practice that the temperature of stored asphaltic concrete within the bin can easily be held well within the optimum values without local overheating and spoilage and without permitting local cooling and setting of the mass.

With this uniform stored product, it is possible then at any time and without particular regard to the operation of the hot mix plant to drive trucks beneath the gates 21 and 22 and by opening the gates at appropriate intervals to discharge a load of asphaltic concrete into each waiting truck, which then drives off. From time to time and not necessarily directly dependent upon the discharge of the bin, the conveyor 7 is operated to replenish the supply. Even though the amount of load in the bin at different times varies greatly from a relatively small amount to nearly full, still the electrical heating with the intervening air chamber and the readily conducting inner shell and mounting walls provide a sufficiently uniform temperature ambience as to result in appropriate operation.

What is claimed is:
1. An asphaltic concrete storage bin comprising:
   (a) an inner shell for holding a charge of asphaltic concrete;
   (b) a thermally conducting mounting wall encompassing said inner shell in spaced relation to afford an intervening air space;
   (c) a thermally insulating layer surrounding said mounting wall in substantially face to face engagement therewith;
   (d) an outer shell encircling said insulating layer;
   (e) a discharge member on the bottom of said shells terminating in a bottom discharging opening;
   (f) means associated with said discharging opening for controlling flow through said discharging opening; and,
   (g) means for maintaining said flow control means at a selected temperature, said discharge member and said flow control means including a collar member depending from the margin of said discharging opening, a muff enclosing said collar member, said muff including an inner wall, an outer wall spaced from said inner wall, an intermediate mounting wall spaced from said inner wall, a thermally insulating jacket separating said outer wall and said intermediate wall, and electrical heating elements on said intermediate wall in face to face arrangement therewith and adjacent said insulating jacket.

2. The apparatus of claim 1 further characterized by electrical heating elements supported on said thermally conducting mounting wall on the side away from said inner shell of said bin and in face to face engagement with said mounting wall and said thermally insulating layer.

3. An asphaltic concrete storage bin comprising:
   (a) an inner shell for holding a charge of asphaltic concrete, said inner shell including a discharging opening adjacent the bottom thereof;
   (b) a substantially continuous mounting wall of thermally conducting material encompassing said inner shell in spaced relation to afford an intervening air space;
   (c) a substantially continuous, thermally insulating layer surrounding said mounting wall;
   (d) an outer shell encompassing said insulating layer;
   (e) means for controlling the flow of asphaltic concrete through said discharging opening; and, (f) means for maintaining said flow controlling means at a selected temperature.

4. The apparatus of claim 3 further characterized by means for heating said mounting wall, said heating means being in substantial face to face engagement with said mounting wall.

References Cited by the Examiner

UNITED STATES PATENTS

| | | | |
|---|---|---|---|
| 1,328,723 | 1/1920 | Curless | 219—424 |
| 1,745,455 | 2/1930 | Seaborn | 219—424 X |
| 2,784,243 | 3/1957 | McAllister et al. | 219—424 X |
| 3,182,859 | 5/1965 | Harris et al. | 222—146 X |

ROBERT B. REEVES, *Primary Examiner.*

HADD S. LANE, *Examiner.*